Jan. 23, 1968

S. H. MICK 3,364,909

ENGINE EXHAUST EMISSION CONTROL SYSTEM
HAVING AIR FLOW CONTROL VALVE

Filed Oct. 24, 1965

INVENTOR.
Stanley H. Mick
BY
J. L. Carpenter
ATTORNEY

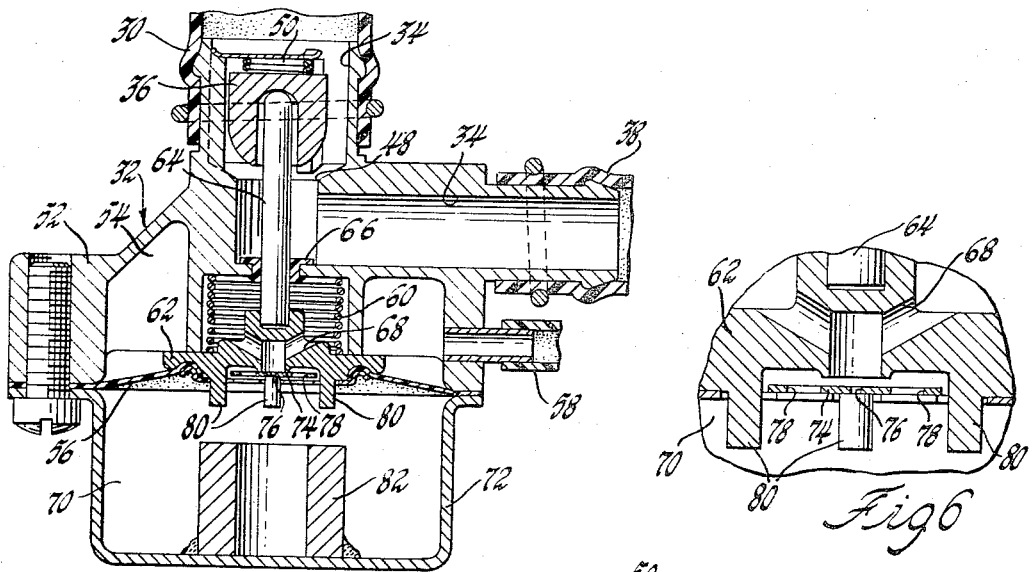
Fig. 4
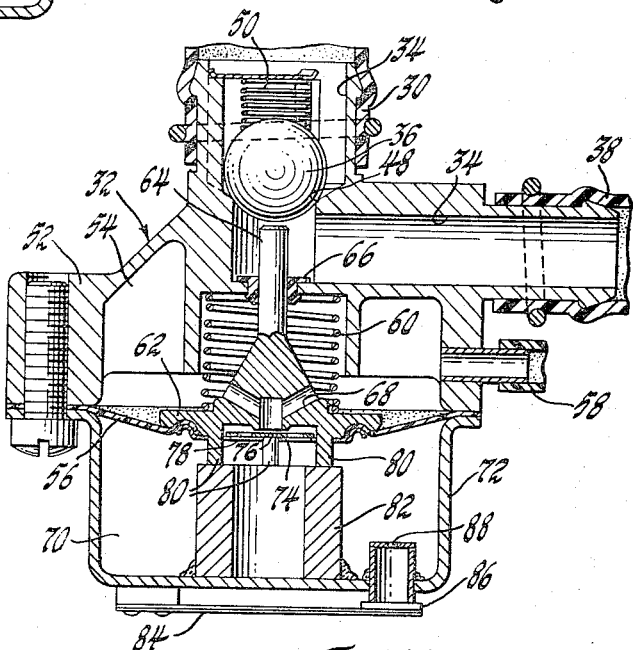
Fig. 6
Fig. 7
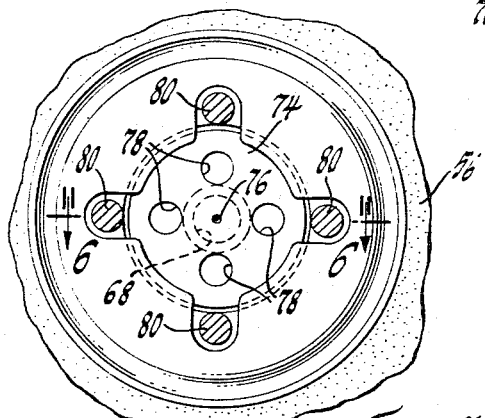
Fig. 5
INVENTOR.
Stanley H. Mick
BY
J. L. Carpenter
ATTORNEY United States Patent Office 3,364,909
Patented Jan. 23, 1968

3,364,909
ENGINE EXHAUST EMISSION CONTROL SYSTEM HAVING AIR FLOW CONTROL VALVE
Stanley H. Mick, St. Clair Shores, Mich., assignor to General Motors Corporation, Detroit, Mich., a corporation of Delaware
Filed Oct. 24, 1965, Ser. No. 504,956
10 Claims. (Cl. 123—97)

ABSTRACT OF THE DISCLOSURE

An engine having an exhaust air injection system in which an engine driven pump delivers air to the stream of exhaust gases as they are emitted from the combustion chambers is equipped with a valve which opens for a predetermined time upon a sudden increase in induction vacuum to pass air from the pump to the intake manifold.

In the recent past, increasing emphasis has been placed on reducing the proportion of unburned constituents such as hydrocarbons and carbon monoxide present in the exhaust gases emitted from internal combustion engines. One of the most effective arrangements devised to accomplish this reduction is the air injection reactor system. In this system, an engine driven air pump delivers air to the stream of hot exhaust gases as they are emitted from the engine combustion chambers. Utilizing the heat of the exhaust gases, the injected air supports additional burning of the exhaust gases in the engine exhaust passages to reduce the proportion of unburned constituents in the exhaust gas.

While this system has been found to be very effective, the temperatures and pressures resulting from an occasional backfire in the exhaust passage during engine deceleration occasionally approach an undesirably high value. This occurrence has been attributed to the substantial increase in the proportion of unburned exhaust gas constituents emitted from the engine combustion chamber during engine deceleration. This, in turn, was found to be due to the fact that the high vacuum in the engine induction system caused poor combustion of the very rich mixture which was delivered to the combustion chambers at this time.

This invention provides an arrangement which controls operation of an engine equipped with an air injection system in order that backfiring may be prevented.

In the illustrated embodiment of this invention, means are provided to pump additional air into the induction system for a predetermined period during deceleration, thereby leaning the mixture delivered to the engine to permit more complete combustion and reduce the proportion of unburned material exhausted from the combustion chambers. This invention thereby alleviates backfiring in the exhaust passages during engine deceleration.

The details as well as other objects and advantages of this invention are disclosed in the following description and in the drawings in which:

FIGURE 4 is a sectional view of the bleed valve illustrating its operation to admit air to the induction system;

FIGURE 5 is an enlarged sectional view along line 5—5 of FIGURE 2 illustrating the restricted passage which times the period during which air is bled into the induction system;

FIGURE 6 is a sectional view along line 6—6 of FIGURE 5; and

FIGURE 7 is a sectional view of an alternative embodiment illustrating a thermostatic control for increasing the period during which air is bled to the engine induction system when the engine is cold.

Figure 1:
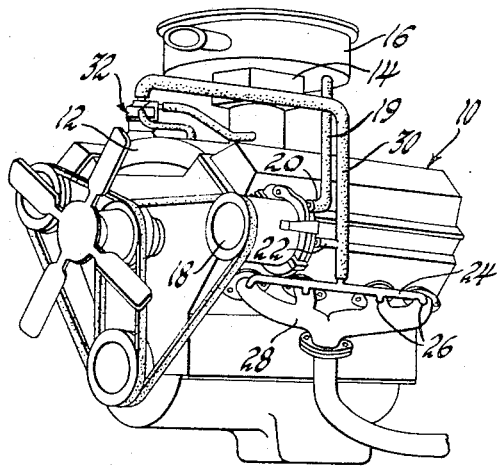
FIGURE 1 is a view of an internal combustion engine which includes an air pump to inject air into the exhaust passages and which also includes the bleed valve of this invention.

Referring now to FIGURE 1, an internal combustion engine 10 has an intake manifold 12 on which a carburetor 14 and an air cleaner 16 are mounted. A pump 18 is driven by the engine to draw clean air through conduit 19, 20 from air cleaner 16 and deliver the air through conduits 22 and 30 to an air manifold 24. Air is injected from manifold 24 through nozzles 26 to the stream of exhaust gases as they are emitted into the exhaust manifold 28. In addition, air pump 18 delivers air through conduits 22 and 30 to the bleed valve 32 provided by this invention.

Figure 3:
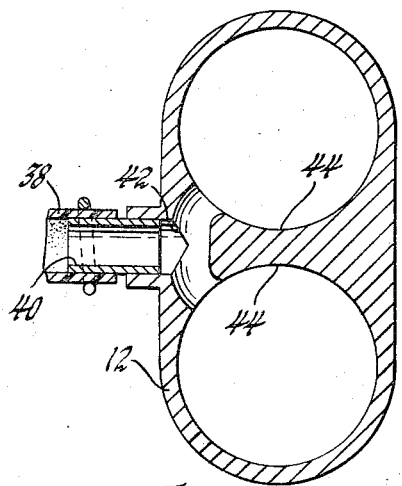
FIGURE 3 is a sectional view along line 3—3 of FIGURE 2 illustrating the connection of the air bleed line with the two mixture conduits of the carburetor.
Figure 2:
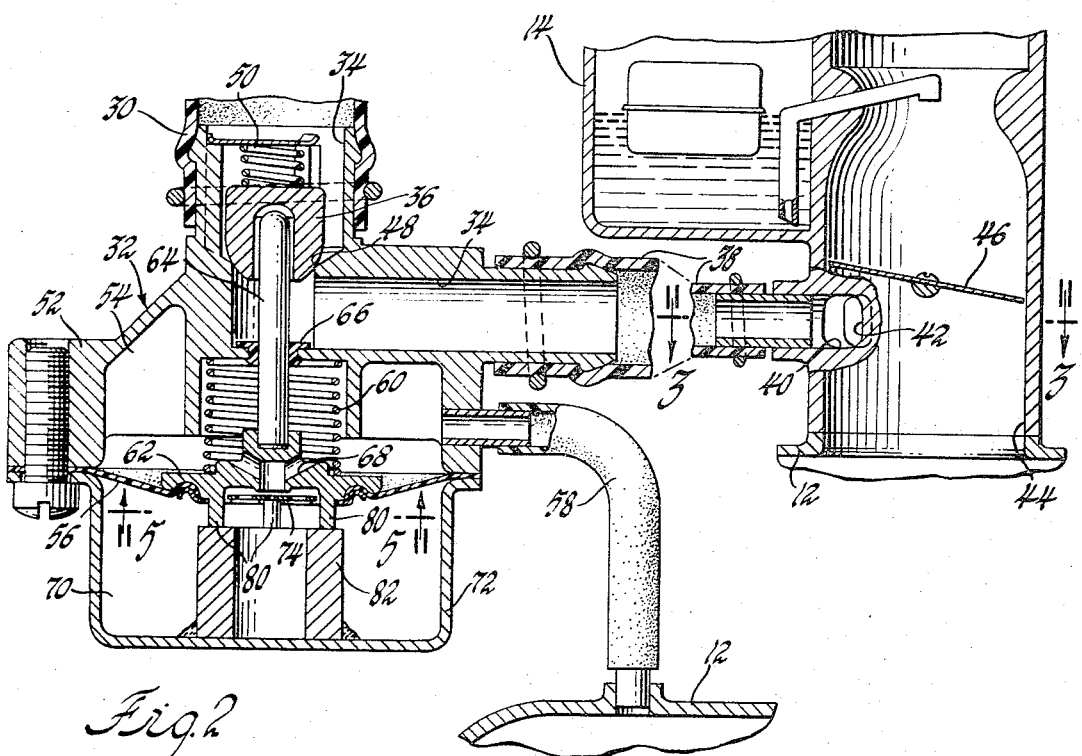
FIGURE 2 is an enlarged sectional view of the bleed valve illustrating its connections to the carburetor and intake manifold which comprises the engine induction system.

Referring now to FIGURE 2, conduit 30 communicates with a passage 34 through bleed valve 32. Air flow through passage 34 is controlled by a valve 36 in the manner described in greater detail below. Air flow from passage 34 is delivered through a conduit 38 to a port 40 in carburetor 14. Port 40 communicates through a T-shaped passage 42 (as illustrated in FIGURE 3) with the mixture conduits 44 of carburetor 14. This connection is made downstream of throttle valves 46 so that air may be bled into the induction system when throttles 46 are closed and the engine is decelerating. Valve 36 closes against valve seat 48 by its own weight and the vacuum in passage 34 and may be assisted in seating by a spring 50 if so desired.

The housing 52 of bleed valve 32 forms a first chamber 54 which is enclosed by a diaphragm 56. A conduit 58 connects chamber 54 with the intake manifold 12 of the engine induction system. During engine deceleration, a high vacuum is developed in intake manifold 12 and chamber 54 which raises diaphragm 56 against the bias of a spring 60. A plate 62 secured to diaphragm 56 carries a plunger 64 which lifts valve 36 from its seat 48 to admit air to the mixture conduits 44.

A seal 66 surrounds plunger 64 to separate passage 34 from chamber 54. Were seal 66 not present, air flow through passage 34 would bleed into chamber 54 and reduce the vacuum causing the diaphragm 56 to flutter and valve 36 to chatter on seat 48.

A passage 68 opens through plate 62 to a second chamber 70 enclosed by the other side of diaphragm 56 and the housing cover 72. A disc valve 74 controls air flow through passage 68 from first chamber 54 to second chamber 70.

As shown in FIGURE 4, during engine deceleration a high vacuum raises diaphragm 56 to open valve 36. At the same time, disc valve 74 is raised to restrict flow through passage 68. As illustrated in FIGURE 6, a small aperture 76 through disc valve 74 permits restricted air flow from chamber 70 to chamber 54. After a period determined by the size of aperture 76, the pressures in chambers 70 and 54 will be balanced so that spring 60 will lower plate 62 and diaphragm 56 to close valve 36. Thus a predetermined amount of air is bled into the induction system past valve 36.

If, before the pressure in chamber 70 is balanced with that in chamber 54, throttle valves 46 are suddenly opened to accelerate the engine, the pressure in intake manifold 12 and chamber 54 rapidly rises. As shown in FIGURES 2 and 6, disc valve 74 then drops to open passage 68. A plurality of large openings 78 are provided through disc valve 74 so that the pressure in chamber 70 may be quickly balanced with that in chamber 54. Plate 62 and diaphragm 56 are then lowered by spring 60 so that the four legs 80 of plate 62 are returned to the stop 82 secured to the housing cover 72.

It should be noted that rather than rely on manifold vacuum to pull air at atmospheric pressure through bleed valve 32, the bleed valve is connected to air pump 18. This arrangement provides a pressurized source to increase the volume of air delivered during the predetermined time valve 36 is opened. At the same time, the air flow through bleed valve 32 is silenced. In addition, the air flow delivered by bleed valve 32 is heated to improve mixing of the air with the air-fuel mixture delivered by the induction system during engine deceleration. Furthermore, the pump, being engine driven, provides air flow which is directly proportional to the speed of the engine, and thus when the engine is decelerating from high speeds, more air is delivered through the bleed valve 32.

When the engine is cold, the ratio of fuel to air in the mixture delivered to the engine during deceleration is much higher than when a warm engine is decelerating. A cold engine may therefore require additional air to properly lean the mixture. For this reason, this invention provides a thermostatic control as shown in FIGURE 7. A thermostat 84, secured to the housing cover 72, carries a valve 86 which closes a restricted vent 88 into chamber 70. When the engine is cold, thermostat 84 opens valve 86 to admit air through vent 88 to chamber 70. The air flow through vent 88 increases the period required to balance the pressures in chambers 70 and 54 and thus increases the period during which valve 36 allows air to flow through passage 34 to the mixture conduits 44. A leaner mixture is delivered to the combustion chambers to reduce the proportion of unburned constituents in the exhaust gases.

I claim:

1. For an internal combustion engine fuel system including an intake passage through which an air-fuel mixture is supplied to the engine and a throttle in said passage controlling flow therethrough, a bleed valve unit adapted to supply a predetermined amount of air to said passage during deceleration of the engine comprising an air flow conduit adapted for connection to said intake passage at a first location downstream of said throttle, a valve controlling air flow through said conduit, a housing divided by a pressure responsive diaphragm to form first and second pressure chambers, plunger means operatively connecting said diaphragm and said valve whereby said valve may be positioned by said diaphragm, a control signal conduit extending from said first chamber and adapted to subject the first chamber side of said diaphragm to the pressure in said intake passage at a second location downstream of said throttle, means providing a restricted passage for air flow from said second chamber to said first chamber whereby said diaphragm is responsive to a decrease of predetermined rate in the intake pressure sufficient to reduce the pressure at the first chamber side of said diaphragm below the pressure on the second chamber side of said diaphragm for a predetermined interval to cause opening of said valve, means biasing said diaphragm, plunger, and valve in a valve-closing direction whereby said valve is closed in the predetermined interval after opening thereof, a vent opening into said second chamber to admit air thereto, and a thermostatically operated valve permitting air flow through said vent only at temperatures below a certain value to thereby extend the predetermined interval in which said valve is open.

2. The bleed valve unit of claim 1 wherein said housing is sealed to prevent air flow directly from said air flow conduit to said first chamber.

3. The bleed valve unit of claim 1 which further includes means providing an unrestricted passage for air flow from said first chamber to said second chamber whereby said diaphragm is responsive to an increase in the intake pressure to close said valve.

4. An internal combustion engine including an intake passage through which a air-fuel mixture is supplied for combustion, a throttle in said passage controlling flow therethrough, an exhaust passage, means to effect burning in said exhaust passage of unburned exhaust gas constituents, and a bleed valve arrangement comprising a supplementary air flow conduit connected to said intake passage at a first location downstream of said throttle, a valve controlling air flow through said conduit, a housing divided by a diaphragm to form first and second pressure chambers, a plunger operatively connecting said diaphragm and said valve, a control signal conduit extending from said first chamber to said intake passage at a second location downstream of said throttle whereby said diaphragm is subjected to the pressure in said intake passage, and means providing a restricted passage for air flow from said second chamber to said first chamber whereby said diaphragm is responsive to a rapid decrease in the intake pressure to open said valve, thereby leaning the air-fuel mixture drawn into the engine and reducing the concentration of unburned exhaust gas constituents to reduce the rate of burning of said constituents in said exhaust passage, said diaphragm, plunger, and valve being biased in a valve-closing direction whereby said valve is closed in a predetermined interval after opening thereof.

5. An internal combustion engine including an intake manifold, a carburetor secured to said intake manifold, said carburetor having a mixture conduit and means to form an air-fuel mixture therein, a throttle in said mixture conduit controlling flow therethrough, said manifold having an intake passage through which the air-fuel mixture is drawn from said mixture conduit, an exhaust passage, means to effect burning in said exhaust passage of unburned exhaust gas constituents, and a bleed valve arrangement comprising a supplementary air flow conduit connected to said mixture conduit downstream of said throttle, a valve controlling air flow through said air flow conduit, a housing divided by a diaphragm to form first and second pressure chambers, a plunger operatively connecting said diaphragm and said valve, a control signal conduit extending from said first chamber to said intake manifold whereby said diaphragm is subjected to the pressure in said intake manifold, and means providing a restricted passage for air flow from said second chamber to said first chamber whereby said diaphragm is responsive to a rapid decrease in the intake pressure to open said valve thereby leaning the air-fuel mixture drawn into the engine and reducing the concentration of unburned exhaust gas constituents to reduce the rate of burning of said constituents in said exhaust passage, said diaphragm, plunger, and valve being biased in a valve-closing direction whereby said valve is closed in a predetermined interval after opening thereof.

6. An internal combustion engine including an intake passage through which an air-fuel mixture is supplied for combustion, a throttle in said passage controlling flow therethrough, an exhaust passage, an air pump having an outlet connected to said exhaust passage to direct air into the exhaust gases therein and effect burning of the unburned exhaust gas constituents, and a bleed valve arrangement comprising a supplementary air flow conduit having an inlet connected to an outlet of said air pump and having an outlet connected to said intake passage at a first location downstream of said throttle, a valve controlling air flow through said conduit, a housing divided by a diaphragm to form first and second pressure chambers, a plunger operatively connecting said diaphragm and said valve, a control signal conduit extending from said first chamber to said intake passage at a second location downstream of said throttle whereby said diaphragm is subjected to the pressure in said intake passage, and means providing a restricted passage for air flow from said second chamber to said first chamber whereby said diaphragm is responsive to a rapid decrease in the intake pressure to open said valve, thereby leaning the air-fuel mixture drawn into the engine and reducing the concentration of unburned exhaust gas constituents to reduce the rate of burning of said constituents in said exhaust passage, said diaphragm, plunger and valve being biased in a valve-closing direction whereby said valve is closed in a predetermined interval after opening thereof.

7. A valve effective to control the flow of air through a passage in response to predetermined changes in the pressure of a control fluid, said valve comprising:

a housing defining a passage through which air can flow, a valve seat in said passage, a valve member in said passage cooperable with said valve seat to obstruct flow through said passage, said valve member being reciprocably movable along a path generally normal to a plane of said valve seat between a flow-obstructing position and a flow-permitting position, said housing further defining a cavity substantially isolated from unrestricted direct fluid communication with said passage.

a flexible pressure responsive diaphragm secured within said cavity in a plane generally normal to the path of said valve member, said diaphragm dividing said cavity into first and second chambers.

a backing plate secured to said diaphragm and reinforcing a substantially centrally located portion of said diaphragm, said backing plate including a substantially centrally located plunger extending toward said valve member in a direction generally normal to the plane of said diaphragm, said housing having an opening through which said plunger extends from said cavity into said passage, said opening including means providing a bearing surface for movement of said plunger and further providing a sealing surface to prevent unrestricted fluid flow from said passage to said cavity, said plunger being cooperable with said valve member to cause reciprocating movement of said valve member upon flexure of said diaphragm, said housing including means adapted for connection to a source of control fluid pressure and further adapted to maintain said first chamber at a pressure directly related to the control fluid pressure whereby said diaphragm may be responsive to changes in the control fluid pressure, a helical spring located in said first chamber and seated between said backing plate and a portion of said housing to bias said plate, diaphragm, and plunger against the force exerted on said diaphragm by the control fluid pressure, stop means against which said plate, diaphragm, and plunger are biased by said spring to establish a normal position for said diaphragm, said plate and said diaphragm having cooperating opening means permitting fluid flow between said chambers, and flat pressure responsive valve means controlling flow through said opening means, said valve means covering said opening means to permit only restricted fluid flow from said second chamber to said first chamber whenever the pressure in said second chamber exceeds the pressure in said first chamber by a predetermined amount, said valve means uncovering said opening means to permit relatively unrestricted fluid flow from said first chamber to said second chamber whenever the pressure in said first chamber exceeds the pressure in said second chamber by a predetermined amount, said diaphragm flexing from a normal position for a predetermined period of time in response to a decrease of predetermined abruptness in the control fluid pressure whereby said plunger moves said valve member from a normal position relative to said valve seat for a predetermined period of time, said spring returning said diaphragm to a normal position whenever the pressure in said second chamber differs from the pressure in said first chamber by less than a predetermined amount whereby said valve member may be returned to a normal position after a predetermined period of time and whereby said valve member may be instantaneously returned to a normal position upon a predetermined increase in the control fluid pressure during that period of time.

8. An exhaust emission control system for an internal combustion engine having an induction conduit and an exhaust conduit defining a portion of a combustibles flow path and having a throttle in said induction conduit, said system comprising the valve of claim 7 and further including an air pump connected to said passage for delivering air therethrough, a conduit extending from said passage and adapated for connection to said combustibles flow path to deliver air from said pump for supporting burning of the combustibles in said flow path, and a further conduit connected to said means adapted for connection to a source of control fluid pressure, said further conduit being adapted for connection to said induction conduit downstream of said throttle.

9. An exhaust emission control system for use on an internal combustion engine having an induction passage and an exhaust passage defining a portion of a combustibles flow path and having a throttle in said induction passage, said system comprising an air pump, a conduit extending from said air pump and adapted for connection to said combustibles flow path to deliver air from said pump for supporting buring of the combustibles in said flow path, a valve in said conduit movable between open and closed positions for controlling flow therethrough, and valve operating means including a housing divided by a pressure responsive diaphragm to form first and second chambers, means operatively connecting said diaphragm and said valve whereby said valve may be positioned by said diaphragm, a control signal conduit extending from said first chamber and adapted for connection to said induction passage downstream of said throttle to subject the first chamber side of said diaphragm to the induction pressure, means providing a restricted passage for air flow from said second chamber to said first chamber whereby said diaphragm is responsive to a decrease of predetermined rate in the induction pressure sufficient to reduce the pressure on the first chamber side of said diaphragm below the pressure on the second chamber side of said diaphragm for a predetermined interval to move said valve from a normal position, and means biasing said diaphragm and valve to the normal position whereby said valve is returned to the normal position in said predetermined interval.

10. An exhaust emission control system for use on an internal combustion engine having an induction passage and an exhaust passage defining a portion of a combustibles flow path and having a throttle in said induction passage, said system comprising an air pump, first conduit means extending from said air pump and adapted for connection to said exhaust passage to deliver air from said pump for supporting burning of the combustibles in said exhaust passage, second conduit means extending from said air pump and adapted for connection to said induction passage at a first location downstream of said throttle to deliver air from said pump for supporting burning of the combustibles in said combustibles flow path, a valve in said second conduit means movable between open and closed positions for controlling flow threthrough, and valve operating means including a housing divided by a pressure responsive diaphragm to form first and second chambers, means operatively connecting said diaphragm and said valve whereby said valve may be positioned by said diaphragm, a control signal conduit extending from said first chamber and adapted for connection to said induction passage at a second location downstream of said throttle to subject the first chamber side of said diaphragm to the induction pressure, means providing a restricted passage from said second chamber to said first chamber whereby said diaphragm is responsive to a decrease of predetermined rate in the induction pressure sufficient to reduce the pressure on the first chamber side of said diaphragm below the pressure on the second chamber side of said diaphragm for a predetermined interval to cause opening of said valve, and means biasing said diaphragm and valve in a valve-closing direction whereby said valve is returned to the normal position in said predetermined interval.

References Cited

UNITED STATES PATENTS

| | | | |
|---|---|---|---|
| 2,211,336 | 8/1940 | Linder | 123—124 |
| 2,969,800 | 1/1961 | Skirvin | 123—124 X |
| 3,081,985 | 3/1963 | Wise | 261—42 |
| 3,213,608 | 10/1965 | Littell | 60—30 |

FOREIGN PATENTS

| | | |
|---|---|---|
| 994,978 | 8/1951 | France. |

RALPH D. BLAKESLEE, *Primary Examiner.*